United States Patent
Mer et al.

(10) Patent No.: US 10,245,921 B2
(45) Date of Patent: Apr. 2, 2019

(54) SYSTEM AND METHOD FOR CONTROLLING COOLANT FLOW THROUGH A HEATER CORE OF A VEHICLE BASED UPON AN ESTIMATED HEATER CORE AIR OUT TEMPERATURE

(71) Applicant: GM Global Technology Operations LLC, Detroit, MI (US)

(72) Inventors: Prashant V. Mer, Rajkot (IN); Vish S. Iyer, Rochester Hills, MI (US); Goutham Ethiraj Shivashankar, Bangalore (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/619,718

(22) Filed: Jun. 12, 2017

(65) Prior Publication Data

US 2018/0354341 A1 Dec. 13, 2018

(51) Int. Cl.
*B60H 1/00* (2006.01)
*B60H 1/02* (2006.01)
*B60H 1/04* (2006.01)

(52) U.S. Cl.
CPC ..... *B60H 1/00807* (2013.01); *B60H 1/00885* (2013.01); *B60H 1/04* (2013.01)

(58) Field of Classification Search
CPC ... B60H 1/00807; B60H 1/00805; B60H 1/04
See application file for complete search history.

(56) References Cited

U.S. PATENT DOCUMENTS

| 7,328,852 B2 | 2/2008 | Paolillo et al. | |
|---|---|---|---|
| 2006/0157576 A1* | 7/2006 | Eisenhour | B60H 1/00735 237/28 |
| 2014/0363752 A1* | 12/2014 | Salvador | H01M 8/04723 429/442 |

* cited by examiner

*Primary Examiner* — Adam D Tissot

(57) ABSTRACT

A system according to the principles of the present disclosure includes a temperature estimation module and a coolant flow control module. The temperature estimation module can determine an estimate of a heater core air out temperature of a vehicle based upon a heater core inlet coolant temperature, a heater core outlet coolant temperature, an estimated volumetric air flowrate, and an estimated volumetric coolant flowrate. The coolant flow control module can control a rate at which coolant flows to a heater core of the vehicle by adjusting a position of a coolant control valve of the vehicle or an output of a coolant pump of the vehicle. The coolant flow control module can control the coolant flowrate to decrease a difference between a target heater core air out temperature and the estimated heater core air out temperature.

20 Claims, 6 Drawing Sheets

SYSTEM AND METHOD FOR CONTROLLING COOLANT FLOW THROUGH A HEATER CORE OF A VEHICLE BASED UPON AN ESTIMATED HEATER CORE AIR OUT TEMPERATURE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for controlling coolant flow through a heater core of a vehicle.

Engine cooling systems typically include, among many components, a coolant pump. The cooling systems may also include a coolant valve. The coolant pump circulates coolant through a cooling system for an engine. A coolant valve, when employed by the engine cooling system, directs the coolant to different components of the cooling system. The components to which coolant is directed typically include a radiator, a heater core, a transmission fluid heat exchanger, and an engine oil heat exchanger.

The heater core is used to heat air flowing to the passenger cabin of the vehicle to maintain the temperature of the passenger cabin. Heat is transferred from coolant circulating through the heater core to air passing through the heater core before the air enters the passenger cabin. Typically, a blower is used to force the air through the heater core and into a duct that supplies air to the passenger cabin.

SUMMARY

A system according to the principles of the present disclosure includes a temperature estimation module and a coolant flow control module. The temperature estimation module can determine an estimate of a heater core air out temperature of a vehicle based upon a heater core inlet coolant temperature, a heater core outlet coolant temperature, an estimated volumetric air flowrate, and an estimated volumetric coolant flowrate. The coolant flow control module can control a rate at which coolant flows to a heater core of the vehicle by adjusting a position of a coolant control valve of the vehicle or an output of a coolant pump of the vehicle. The coolant flow control module can control the coolant flowrate to decrease a difference between a target heater core air out temperature and the estimated heater core air out temperature.

In other features, the temperature estimation module is configured to estimate the heater core air out temperature using a least square estimation. In other features, the temperature estimation module is configured to estimate the heater core air out temperature based upon the heater core inlet coolant temperature, the heater core outlet coolant temperature, a volumetric coolant flowrate, and a volumetric air flowrate. In other features, the temperature estimation module is configured to estimate the heater core air out temperature according to $\alpha_1 \dot{v}_{clnt} + \alpha_2 \dot{v}_{air} + \alpha_3 T_{Clnt,In} + \alpha_4 T_{Clnt,Out} + \alpha_5$, where $\dot{v}_{clnt}$ is a volumetric coolant flowrate, $\dot{v}_{air}$ is the volumetric air flowrate, $T_{Clnt,In}$ is the heater core inlet coolant temperature, $T_{Clnt,Out}$ is the heater core outlet coolant temperature, and $\alpha_i$ represents respective least square estimate coefficients.

In other features, the estimated heater core air out temperature is bounded by the heater core inlet coolant temperature having a predefined offset and the heater core outlet coolant temperature having a predefined offset. In other features, the coolant flow control module is configured to compare the difference between the target heater core air out temperature and the estimated heater core air out temperature, determine whether the difference exceeds a predefined error threshold, and controls the coolant flowrate to decrease a difference between the target heater core air out temperature and the estimated heater core air out temperature.

In other features, the target heater core air out temperature is determined based on blower speed and ambient temperature. In other features, the coolant flow control module is configured to adjust the coolant flowrate based upon at least one of a predetermined coolant flowrate and a predetermined increment. In other features, the coolant flow control module is configured to adjust the coolant flowrate based upon a variable coolant flowrate or a variable increment. In other features, the variable increment is based upon a control setting. In other features, the control setting includes a Proportional-Integral-Derivative (PID) control or a table look-up control.

In other features, the system includes a heater core inlet coolant temperature sensor disposed at an heater core inlet line to measure the heater core inlet coolant temperature entering a heater core of a vehicle and a heater core outlet coolant temperature sensor disposed at a heater core outlet line to measure the heater core outlet coolant temperature exiting the heater core. In other features, the system includes a volumetric coolant flowrate estimation module that is configured to estimate a volumetric coolant flowrate of a coolant. In other features, the system includes an airflow estimation module that is configured to estimate a volumetric air flowrate. In other features, the system includes a heater flap control module that is configured to control a heater flap opening to control an amount of air that passes through a heater flap.

A system according to the principles of the present disclosure includes a temperature estimation module and a coolant flow control module. The temperature estimation module can determine a delta temperature value associated with a heater core of a vehicle based upon on a heater core inlet coolant temperature and a heater core outlet coolant temperature. The coolant flow control module can compare the delta temperature value with a target delta temperature value. The coolant flow control module can determine a difference between the delta temperature value with a target delta coolant temperature exceeds a predefined threshold and decrease the difference between the delta target temperature value and the target delta coolant temperature when the difference exceeds the predefined threshold.

In other features, the delta temperature value includes a coolant temperature drop across the heater core. In other features, the system includes a heater core inlet coolant temperature sensor disposed at an heater core inlet line to measure the heater core inlet coolant temperature entering a heater core of a vehicle and a heater core outlet coolant temperature sensor disposed at a heater core outlet line to measure the heater core outlet coolant temperature exiting the heater core.

In other features, the delta temperature value includes a difference between the measured heater core outlet coolant temperature and the measured heater core inlet coolant temperature. In other features, the coolant flow control module is further configured to adjust coolant flowrate based on a variable target coolant delta temperature.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
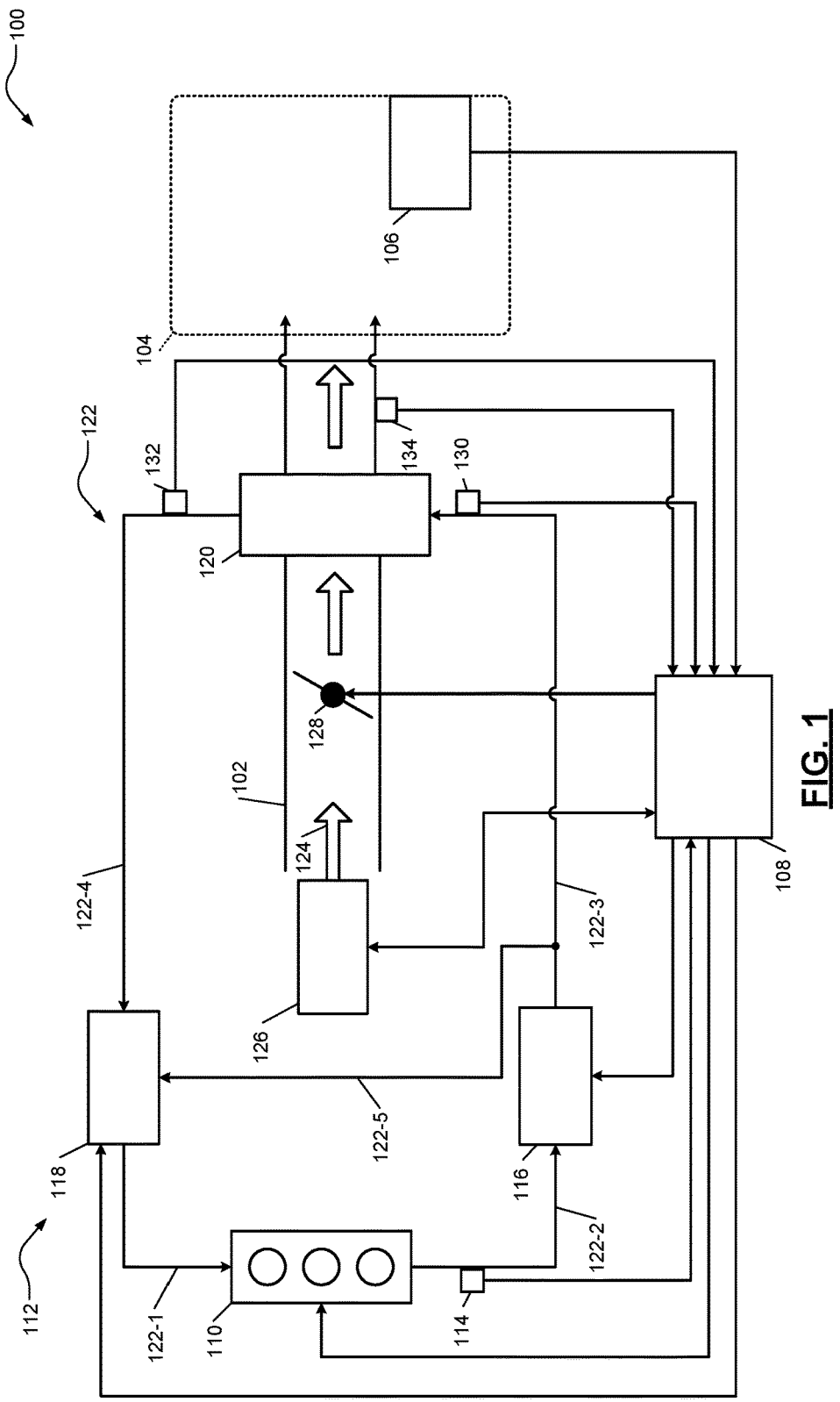
FIG. 1 is a functional block diagram of an example vehicle system including a control module according to the principles of the present disclosure.

Engine cooling systems circulate coolant to transfer heat generated by an engine to other parts of the cooling system, such as a heater core, radiator etc. Coolant is circulated by a coolant pump, and the rate at which coolant is circulated through the engine cooling system is controlled by adjusting the output of the coolant pump speed and/or the position a coolant control valve, if employed by the engine cooling system.

In vehicles that are not equipped with an automatic engine start-stop system, one coolant pump is typically used to circulate coolant through the coolant system, and the coolant pump is typically driven by the engine (i.e., mechanically driven). Thus, the speed of the pump, hydraulic restrictions, and engine coolant temperature dictate the maximum rate at which coolant is circulated through the cooling system, which includes the heater core through which cabin heat is provided to meet the demand of passengers.

In vehicles that are equipped with an automatic engine start-stop system, multiple coolant pumps are typically used to circulate coolant through the cooling system. The coolant pumps include a primary coolant pump that is mechanically driven, and an auxiliary coolant pump that is electrically driven. In some cases, operation of the auxiliary coolant pump is enabled, amongst other conditions, based on an error between a measured temperature of air in a duct that supplies air to a passenger cabin of a vehicle and a target air temperature that is set by a vehicle occupant. More specifically, the auxiliary coolant pump is started (i.e., turned on) when the error exceeds a threshold value and stopped (i.e., turned off) when the error no longer exceeds the threshold value. When the auxiliary coolant pump is started, the auxiliary coolant pump is operated at a fixed capacity (i.e., independent of the error).

In some vehicles equipped with an automatic engine start-stop system, the primary coolant pump is electrically driven and is the only coolant pump in the cooling system. In these vehicles, the primary coolant pump is operated when the engine is running. The primary coolant pump is also operated when the engine is automatically stopped (i.e., stopped independent of an ignition system of the engine) in order to circulate coolant through a heater core.

Regardless of whether a vehicle is equipped with an electrically-driven and/or mechanically-driven coolant pump, the flowrate of coolant circulated through the heater core is typically controlled based on the temperature of the coolant, as well as other parameters (i.e., pump speed, hydraulic restrictions, etc.) The coolant flowrate is generally increased as the coolant temperature increases in order to provide additional cooling to the engine. Thus, when the coolant temperature is greater than or equal to its normal operating temperature, the coolant flowrate is set to at or near its maximum value.

In order to control the temperature of the air supplied to the passenger cabin, coolant is circulated through the heater core, and a heater flap and/or blower is adjusted to vary the amount of air that passes through the heater core. Since the coolant flowrate is generally increased as the coolant temperature increases, the coolant circulating through the heater core may supply more heat than necessary to maintain the cabin air temperature at a target temperature. The heater flap may be at least partially closed to decrease the amount of airflow through the heater core when the blower is operating in a constant state.

However, controlling the coolant flowrate as described above ignores the heat capacity of the cooling system to satisfy cabin heating demands at a lower coolant flowrate. In addition, circulating coolant through the heater core at a rate that is greater than the rate necessary to maintain the cabin air temperature at a target temperature may overcool the engine. Overcooling an engine causes the combustion temperature of the engine to decrease, which degrades fuel economy, emissions, and engine performance (e.g., horsepower, torque).

A control system according to the present disclosure employs sensors to measure various parameters, adjusts coolant flow to the heater core based on an error between an estimated heater core air out temperature and a target heater core air temperature or the difference between heater core inlet coolant temperature and a heater core outlet coolant temperature for a given heater core inlet coolant temperature. This control system can be employed within vehicles where driver inputs cannot be directly used or are inaccessible.

For example, when driver inputs cannot be used or are inaccessible, full heating capacity is maintained at the exit of the heater core by targeting heater core air out as a function of blower speed feedback and ambient air temperature or by targeting a difference between heater core coolant out temperature and heater core inlet coolant temperature for a given heater core inlet coolant temperature. Heater core flow is adjusted to reduce the error between target and estimated heater core air out or is adjusted to maintain the difference between heater core inlet and heater core outlet coolant temperature. Once heater core flow for full heat capacity is determined and maintained, primary HVAC controls can be used (i.e., drive heater flaps, mode doors, blower, etc.) to correct position to provide a desired comfort level.

By controlling the coolant flow through the heater core in the manner described above, the system minimizes the coolant flow through the heater core while maintaining the cabin air temperature at or near the target temperature. Minimizing coolant flow through the heater core avoids overcooling the engine, and thereby maintains combustion temperatures at a desired temperature. As a result, the system improves fuel economy, improves engine performance, and reduces emissions.

Referring to FIG. 1, an example vehicle system 100 includes a duct 102 that supplies heated air to a cabin 104 of a vehicle. The cabin 104 includes a user interface device 106, such as a touchscreen or a button, that allows an occupant to select a target air temperature for the cabin 104. A user may directly set the target air temperature by selecting a specific temperature. Alternatively, the user may select a heating or cooling level, such as "full heat," and a vehicle control module (VCM) 108 may set the target air temperature based on a predetermined relationship between the target air temperature and the heating or cooling level. In this way, the user indirectly sets the target air temperature by selecting the heating or cooling level.

An engine 110 combusts air and fuel in a combustion chamber of a cylinder to generate drive torque. For example, during combustion, a piston reciprocates within the cylinder to generate the drive torque. Engine oil is used to lubricate the moving piston and other moving parts in the engine 110.

A cooling system 112 circulates coolant through various portions of the engine 110, such as a cylinder head, an engine block, integrated exhaust manifold, radiator, heater core, turbo etc. Generally, the cooling system 112 is used to absorb heat from the engine, the transmission, and other components, and to transfer the heat to air. For example, the cooling system 112 may circulate coolant through an engine oil heat exchanger and/or a transmission heat exchanger to absorb heat from the engine oil and/or the transmission fluid, respectively.

In the example shown, the cooling system 112 includes a volumetric coolant flowrate estimation module 114, a coolant pump 116, a coolant control valve 118, a heater core 120, and coolant lines 122. The cooling system 112 may also include a radiator, the engine oil heat exchanger, and/or the transmission fluid heat exchanger. The coolant lines 122 include an engine inlet line 122-1, an engine outlet line 122-2, a heater core inlet line 122-3, a heater core outlet line 122-4, and a heater core bypass line 122-5. In this implementation, volumetric coolant flowrate is estimated using parameters such as coolant pump speed, coolant control valve position, known hydraulic restrictions, and coolant temperature.

The coolant pump 116 may be electrically-driven and is disposed downstream of the engine 110 and upstream of the heater core 120. When the coolant pump 116 is on, the coolant pump 116 circulates coolant through the engine 110, the heater core 120, coolant lines 122, radiator, the engine oil heat exchanger, and the transmission fluid heat exchanger if these components are included in the cooling system 112.

The coolant control valve 118 regulates the rate of coolant flow to various components of the cooling system 112 such as the radiator, the heater core 120, the transmission fluid heat exchanger, and/or the engine oil heat exchanger. The coolant control valve 118 also controls whether coolant is allowed to flow to these components. The coolant control valve 118 may include a multiple input, multiple output valve or one or more other suitable valves. In various implementations, the coolant control valve 118 may be partitioned and have two or more separate chambers.

The coolant control valve 118 may bypass the heater core 120 when one or more operating conditions of the vehicle system 100 satisfy predetermined criteria. For example, the coolant control valve 118 may bypass the heater core 120 when the engine 110 is started to increase the coolant temperature to its operating temperature faster. The coolant control valve 118 may bypass the heater core 120 by preventing coolant flow from the heater core outlet line 122-4 to the engine inlet line 122-1. In turn, coolant may flow through the heater core bypass line 122-5 instead of flowing through the heater core 120. The coolant control valve 118 may prevent flow from the heater core inlet line 122-3 to the heater core bypass line 122-5 when the coolant control valve 118 is not bypassing the heater core 120.

In various implementations, the coolant control valve 118 may be located at the junction between the heater core inlet line 122-3 and the heater core bypass line 122-5. In these implementations, the coolant control valve 118 may bypass the heater core 120 by preventing coolant flow from the coolant pump 116 to the heater core inlet line 122-3. In addition, the coolant control valve 118 may allow coolant flow through the heater core bypass line 122-5 when bypassing the heater core 120, and otherwise prevent coolant flow through the heater core bypass line 122-5.

The heater core 120 is a heat exchanger that transfers heat from engine coolant to air passing through the heater core 120. The heater core 120 is disposed in the duct 102. The heater core 120 receives air 124 from an engine compartment. More specifically, a blower 126 directs the air 124 to the heater core 120 through the duct 102.

One or more heater flaps 128 and blower 126 is/are disposed in the duct 102 and regulates the flow of air from the engine compartment or evaporator to the heater core 120. The heater flap(s) 128 may include a plate or door and an actuator, such as a solenoid, that adjusts the position of the plate to adjust the opening percentage of the heater flap(s) 128. The heater flap(s) 128 allows more air to pass through the heater core when the opening percentage of the heater flap(s) 128 is increased, and vice versa, when a blower 128 is maintaining a constant blower speed.

As shown, the vehicle system 100 includes a heater core inlet coolant temperature sensor 130, a heater core outlet coolant temperature sensor 132, and an airflow estimation module 134. In this implementation, the heater core inlet coolant temperature sensor 130 is disposed at the heater core inlet line 122-3 to measure the coolant temperature entering the heater core 120. In this implementation, the heater core outlet coolant temperature sensor 132 is disposed at the heater core outlet line 122-4 to measure the coolant temperature exiting the heater core 120. The maximum duct air flowrate $F_A$ can be estimated based on the HVAC module design and blower 126 parameters. The airflow estimation module estimates the volumetric air flowrate within the vehicle system 100.

Feedback from the blower 126, the heater core inlet coolant temperature sensor 130, the heater core outlet coolant temperature sensor 132, and/or other related parameters are inputs to the VCM 108. In response to the inputs, the VCM 108 controls the engine 110, the coolant pump 116, the coolant control valve 118, the blower 126, and the heater flap(s) 128. The VCM 108 controls the coolant control valve 118 and/or the coolant pump 116 to control the flow of coolant through the heater core 120 to maintain the estimated heater core air out temperature at approximately the target heater core air out temperature or maintain a target heater core coolant temperature differential.

Figure 2:
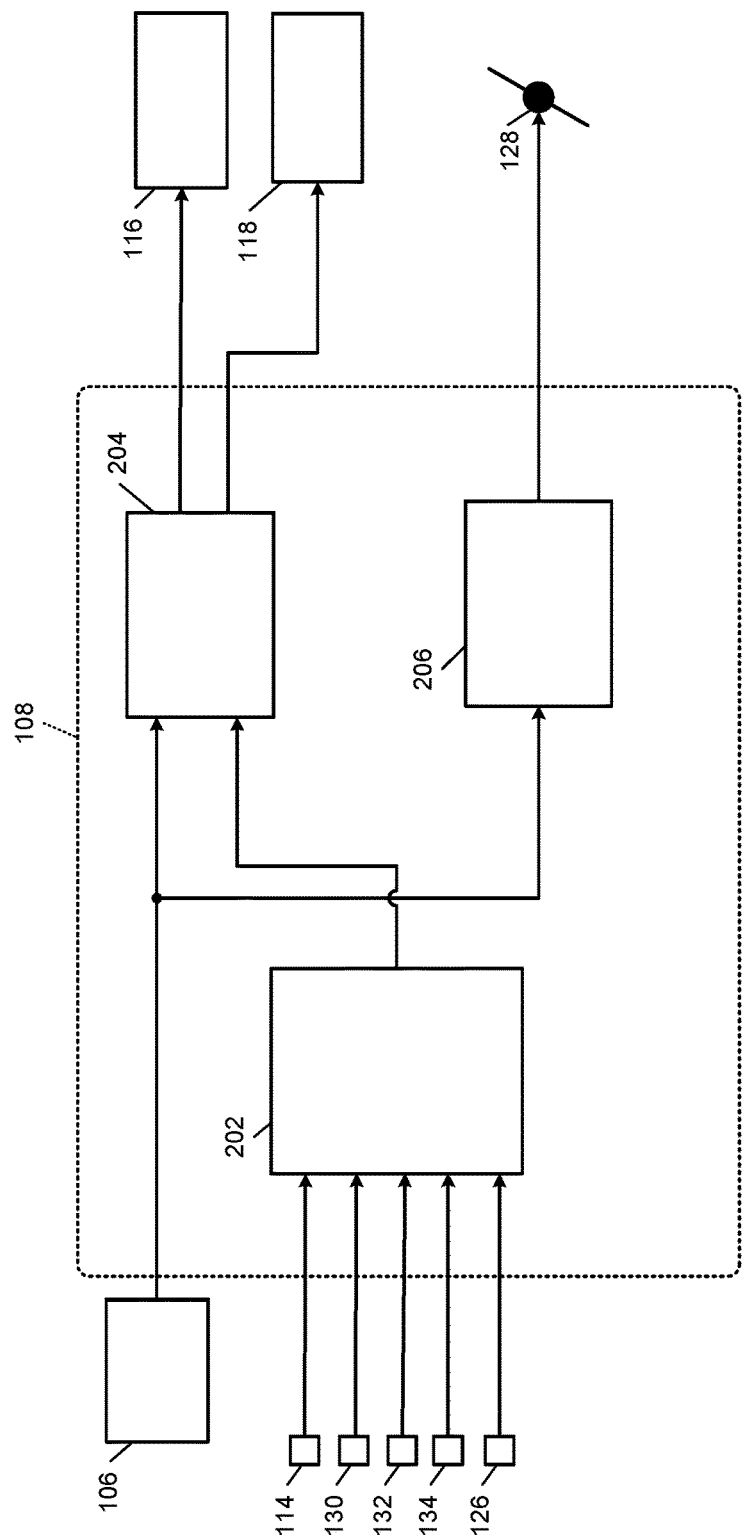
FIG. 2 is a functional block diagram of the control module of FIG. 1.

Referring now to FIG. 2, an example implementation of the VCM 108 includes a temperature estimation module 202, a coolant flow control module 204, and a heater flap(s) control module 206. The temperature estimation module 202 receives inputs from the volumetric coolant flowrate estimation module 114, the airflow estimation module 134, the heater core inlet coolant temperature sensor 130, and the heater core outlet coolant temperature sensor 132.

In one or more implementations, the temperature estimation module 202 uses a least square estimation, such as an offline linear Least Square Error (LSE) estimation, to estimate the heater core air out temperature. For instance, the temperature estimation module 202 estimates the heater core air out temperature according to:

$$T_{Out,Air} = \alpha_1 \dot{v}_{clnt} + \alpha_2 \dot{v}_{air} + \alpha_3 T_{Clnt,In} + \alpha_4 T_{Clnt,Out} + \alpha_5 \quad (1)$$

where $\dot{v}_{clnt}$ is a volumetric heater core coolant flowrate estimated by the volumetric coolant flowrate estimation module 114, $\dot{v}_{air}$ is a volumetric air flowrate estimated by the airflow estimation module 134, $T_{Clnt,In}$ is a heater core inlet coolant temperature measured by the heater core inlet coolant temperature sensor 130, $T_{Clnt,Out}$ is a heater core outlet coolant temperature measured by the heater core outlet coolant temperature sensor 132, and $\alpha_i$ are respective least square estimate coefficients. The least square estimate coefficients are determined by obtaining $T_{Clnt,Out}$, $T_{Clnt,In}$, $\dot{v}_{air}$, $\dot{v}_{clnt}$ data along with heater core thermocouple grid data (e.g., the average of which is $T_{Out,Air\_Actual}$)) and using an Offline Least Square Error Estimator such that the least squared error between an estimated and an average of actual heater core air out temperature is achieved.

The estimated heater core air out temperature is bounded by the heater core inlet coolant temperature, $T_{Clnt,In}$ and the heater core outlet coolant temperature $T_{Clnt,Out}$ with predefined offsets ($K_{Offset,In}$, $K_{Offset,Out}$) as set forth below:

$$T_{Out,Air} \leq (T_{Clnt,In} - K_{Offset,In}), T_{Out,Air} \geq (T_{Clnt,Out} + K_{Offset,Out}) \quad (2)$$

In various implementations, the predefined offsets can be determined from development testing by analyzing the data in different ambient and vehicle operating conditions.

The temperature estimation module 202 generates an estimated heater core air out temperature $T_{Out,Air}$ signal, which is representative of the average heater core air out temperature $T_{Out,Air\_Actual}$. The temperature estimation signal and the target heater core air out temperature are provided to the coolant flow control module 204 as inputs. The coolant flow control module 204 adjusts the heater core flow to minimize error between target heater core air out temperature and the estimated heater core air out temperature when the control mode is set to control heater flow.

The coolant flow control module 204 controls coolant flow to meet full heat capacity based upon the determined heater core air out temperature Error (δ). For instance, the coolant flow control module 204 compares the determined estimated heater core air out temperature to the target heater core air out temperature. If the difference between the determined heater core air out temperature and the target heater core air out temperature is below a predefined error threshold, the coolant flow control module 204 modifies (i.e., increases, decreases) a coolant flow to meet the targeted heat demand. The VCM 108 re-calculates the determined error temperature during respective execution/computation cycle and adjusts the coolant flow accordingly.

In another implementation, the VCM 108 maintains a heat capacity within the cooling system 112 by controlling a coolant temperature drop across the heater core 120. The heat capacity can be maintained to allow the cooling system 112 to provide heat within the cabin 104 over a range of ambient temperatures and vehicle operating conditions without overcooling the engine.

In this implementation, the VCM 108 maintains a coolant temperature drop across the heater core 120 as a function of heater core inlet coolant temperature to mitigate overcooling of the engine 110 and powertrain blocks as well as improve heater core air out temperature spread for better customer experience. The coolant temperature drop across heater core 110 indirectly controls the heater core air out temperature. Additionally, the heater core air out temperature is maintained between heater core inlet coolant temperature and the heater core outlet coolant temperature.

Target coolant delta temperature is reduced when heater core inlet coolant temperature is low to maintain heat capacity in the cooling system 112 and to provide heating inside the cabin. As a result, a reduced target coolant delta temperature results in a higher coolant flow request, a higher heater core out coolant temperature, and a higher heater core air out temperature. Similarly, when heater core inlet coolant temperature increases, the target coolant delta temperature is increased to maintain heater core air out temperature and coolant flow is reduced.

In this implementation, the temperature estimation module 202 receives as inputs the heater core inlet coolant temperature measured by the heater core inlet coolant temperature sensor 130 and the heater core outlet coolant temperature measured by the heater core outlet coolant temperature sensor 132. The temperature estimation module 202 determines the difference (i.e., delta) between the heater core inlet coolant temperature and the heater core outlet coolant temperature and provides a coolant temperature delta signal to the coolant flow control module 204.

Based upon the coolant temperature delta signal, the coolant flow control module 204 maintains the heating capacity within the cooling system 112 by controlling the temperature drop across the heater core 120. For instance, the coolant flow control module 204 compares the coolant temperature delta signal with a target coolant delta temperature. The coolant temperature delta signal along with heater core inlet coolant temperature is indicative of the air temperature output by the heater core 120. When the coolant flow control module 204 determines that a difference between the coolant temperature delta signal and the target coolant temperature delta signal exceeds a predefined error threshold, the coolant control module 204 modifies the coolant flow to control the coolant temperature drop across the heater core 120.

In some implementations, the VCM 108 includes a heater flap control module 206 that controls the amount of air that passes from the blower 126 through the heater flap(s) 128 to the heater core 120. The heater flap control module 206 controls an opening amount (e.g., opening percentage) of the heater flap(s) 128 based on an input from the user interface device 106. Thus, the heater flap(s) control module 206 increases the heater flap(s) opening amount to meet a higher heating demand and decreases the heater flap(s) opening to meet a lower heating demand.

Figure 3:
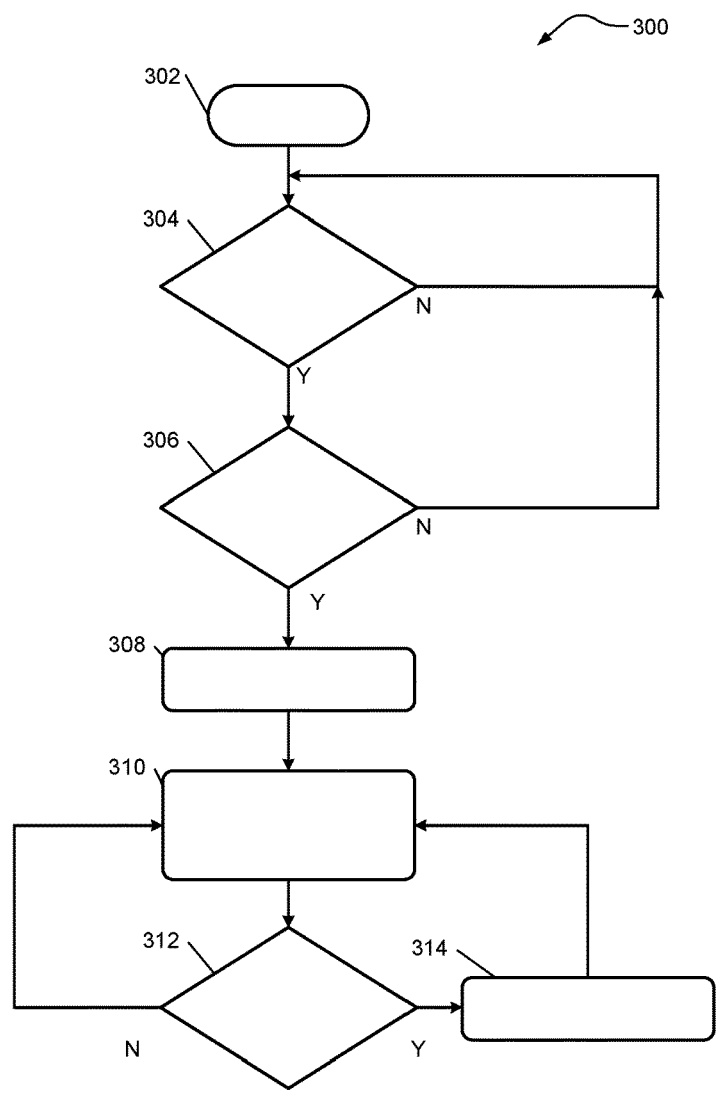
FIGS. 3 and 4 are flowcharts illustrating an example control method according to the principles of the present disclosure.

FIG. 3 illustrates an example method 300 for estimating a heater core out temperature as a function of heater core inlet coolant temperature and heater core outlet coolant temperature. The method is described in the context of the modules included in the example implementation of the VCM 108 shown in FIG. 2. However, the particular modules that perform the steps of the method may be different than those mentioned below and/or the method may be implemented apart from the modules of FIG. 2. The method 300 begins at 302.

At 304, the coolant flow control module 204 determines whether cabin heating is active. Cabin heating can be detected when the user interface device 106 is set above full cold. For example, the user interface device 106 may be set to heat the vehicle cabin 104 to a certain temperature or to a temperature level. If cabin heating is active, the method continues at 306. Otherwise, the method remains at 304 and continues to determine whether cabin heating is active.

At 306, the coolant flow control module 204 determines whether a propulsion system is active (e.g., whether the engine 110 is running). If the propulsion system is active, the method continues at 308. Otherwise, the method returns to 304. At 308, the temperature estimation module 202 receives data (i.e., measured data, estimated data, etc.). The data includes estimated coolant flowrate $\dot{v}_{clnt}$ as provided by a volumetric coolant flowrate estimation module 114, estimated air flowrate $\dot{v}_{air}$ as provided by airflow estimation module 134 $T_{Clnt,In}$ as measured by the heater core inlet coolant temperature sensor 130, and $T_{Clnt,Out}$ as measured by the heater core outlet coolant temperature sensor 132.

At 310, the temperature estimation module 202 estimates the heater core air out temperature based upon the received data. In an implementation, the temperature estimation module 202 estimates the heater core air out temperature using Equation 1. The temperature estimation module 202 provides a temperature estimation signal indicative of the estimated heater core air out temperature to the coolant flow control module 204.

At 312, the coolant flow control module 204 compares the estimated heater core air out temperature to the target air temperature. For instance, the coolant flow control module 204 determines the difference between the estimated heater core air out temperature to the target air temperature. If the difference exceeds a predefined error threshold, the coolant flow control module 204 modifies a coolant flow to meet the occupant heating demand and minimize the determined error temperature (i.e., determined temperature difference) at 314. The coolant flow control module 204 controls the coolant pump 116 and/or the coolant control valve 118 to modify the coolant flowrate by a variable coolant flowrate increments or predefined increments based on control method settings (e.g., a Proportional-Integral-Derivative (PID) control, a table look-up control) to drive the heater core air out error to zero or approximately zero.

As shown, once the coolant flowrate is adjusted, the method 300 transitions to 310 to re-estimate the heater core air out temperature. If the difference does not exceed the predefined error threshold, the method 300 returns to 310 to re-estimate the heater core air out temperature.

Figure 4:
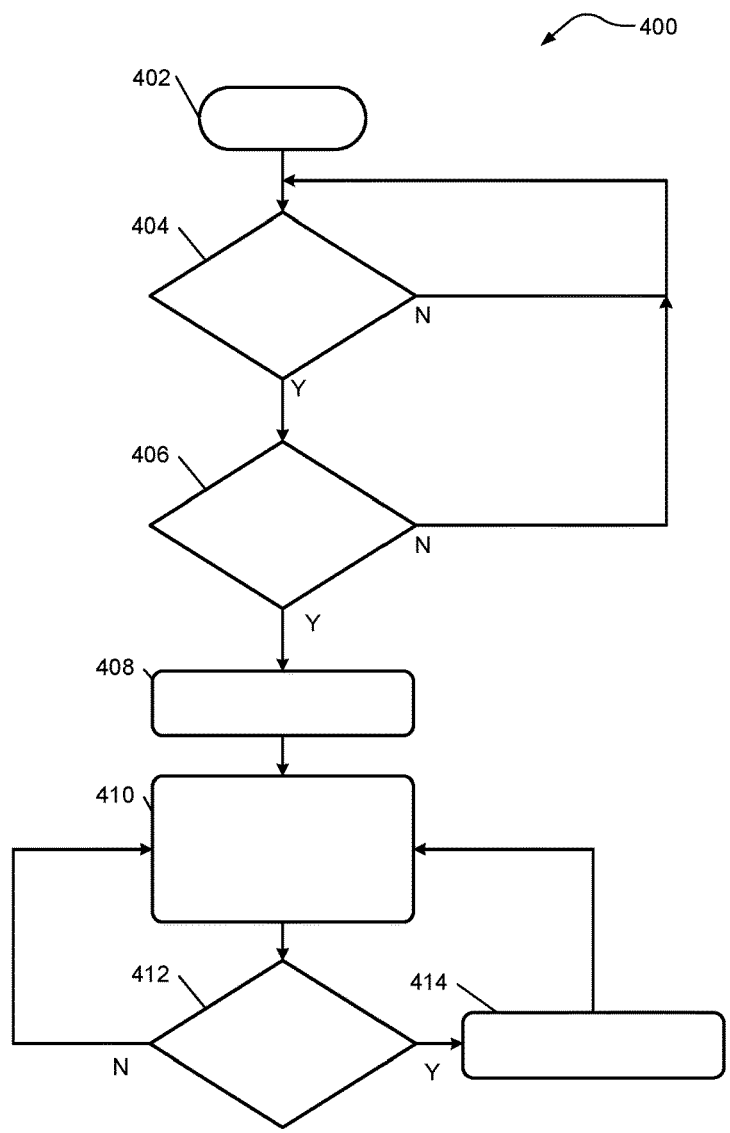

FIG. 4 illustrates an example method 400 for using a temperature difference between the heater core inlet coolant temperature and the heater core outlet coolant temperature to adjust a coolant flowrate to the heater core 120. The method is described in the context of the modules included in the example implementation of the VCM 108 shown in FIG. 2. However, the particular modules that perform the steps of the method may be different than those mentioned below and/or the method may be implemented apart from the modules of FIG. 2. The method 400 begins at 402.

At 404, the coolant flow control module 204 determines whether cabin heating is active. If cabin heating is active, the method continues at 406. Otherwise, the method remains at 404 and continues to determine whether cabin heating is active.

At 406, the coolant flow control module 204 determines whether a propulsion system is active (e.g., whether the engine 110 is running). If the propulsion system is active, the method continues at 408. Otherwise, the method returns to 402. At 408, the temperature estimation module 202 receives data (i.e., measured data, estimated data). The data includes $T_{Clnt,In}$ as measured by the heater core inlet coolant temperature sensor 130, $T_{Clnt,Out}$ as measured by the heater core outlet coolant temperature sensor 132, and $\dot{v}_{clnt}$, an estimated volumetric flowrate of coolant from the volumetric coolant flowrate estimation module 114.

At 410, the temperature estimation module 202 determines heat extraction and/or a coolant temperature drop across the heater core 120 based upon the received data. The coolant temperature drop across the heater core 120 indirectly controls the heater core air out temperature because the heater core air out temperature is between heater core inlet coolant temperature and heater core outlet coolant temperature. The temperature estimation module 202 provides a delta coolant temperature signal indicative of the coolant temperature drop across the heater core 120 to the coolant flow control module 204. For example, the coolant temperature drop is measured difference between the heater core outlet coolant temperature and the heater core inlet coolant temperature.

At 412, the coolant flow control module 204 compares the delta temperature value to the target delta coolant temperature. For instance, the coolant flow control module 204 determines whether the difference between the delta coolant temperature value and the target delta coolant temperature difference exceeds a predefined error threshold. The target coolant temperature difference can be based upon the target air temperature. If the difference exceeds the predefined error threshold, the coolant flow control module 204 modifies a coolant flow to meet the occupant heating demand at 414. For instance, the coolant flow control module 204 controls the coolant pump 116 and/or the coolant control valve 118 to modify the coolant flowrate to reduce control error. For instance, a reduced target coolant delta temperature leads to a higher coolant flow request, a higher heater core out coolant temperature, and a higher heater core air out temperature. Similarly, when heater core inlet coolant temperature increases, the target coolant delta temperature can be increased to maintain heater core air out temperature and coolant flow is reduced. The coolant flow control module 204 can adjust coolant flowrate based on a variable target coolant delta temperature. The method 400 then transitions to 410 to re-determine the heat extraction and/or a coolant temperature drop across the heater core 120. If the difference does not exceed the predefined error threshold, the method 400 returns to 410 to re-determine the heat extraction and/or a coolant temperature drop across the heater core.

Figure 5:
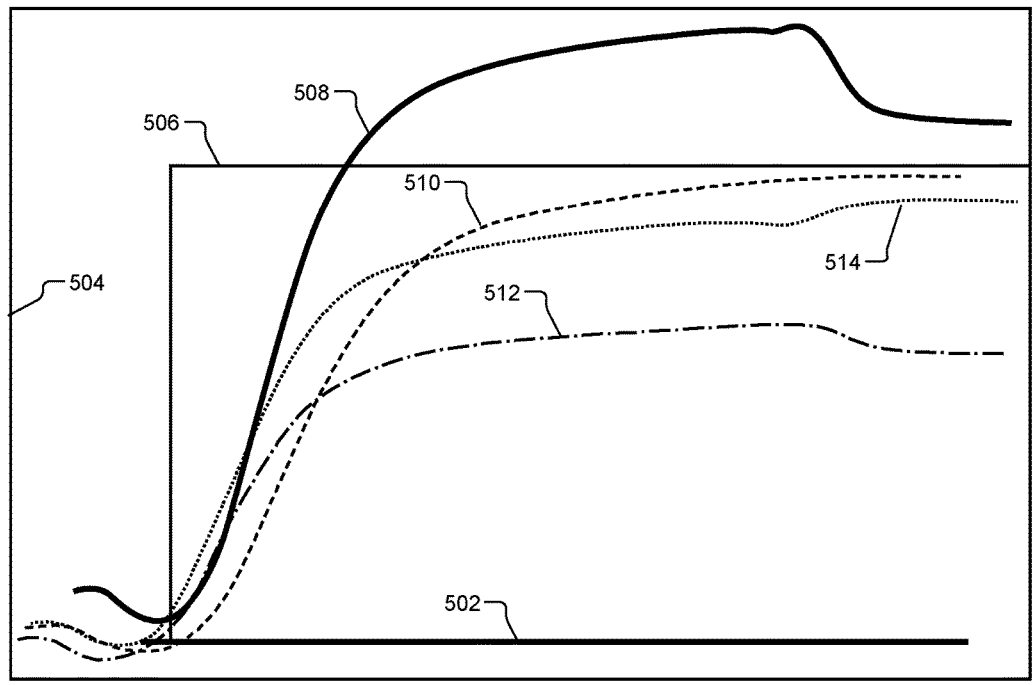
FIG. 5 is a graph illustrating an example control method according to the principles of the present disclosure.

Referring to FIG. 5, a graph illustrates the effect of an example coolant flow control method according to the principles of the present disclosure. The graph includes an x-axis 502, a y-axis 504, a target heater core air out temperature 506, a heater core inlet coolant temperature 508, an estimated heater core air out temperature 510, an air flow 512, and a heater core outlet coolant temperature 514. The x-axis 502 represents time, and the y-axis 504 represents the temperature. FIG. 5 illustrates that heating demand is accomplished by targeting the heater core out temperature and controlling the difference between the estimated heater core air out temperature and the target heater core air temperature. The difference can be controlled by adjusting the flow of coolant to the heater core 120 with respect to method 300.

Figure 6:
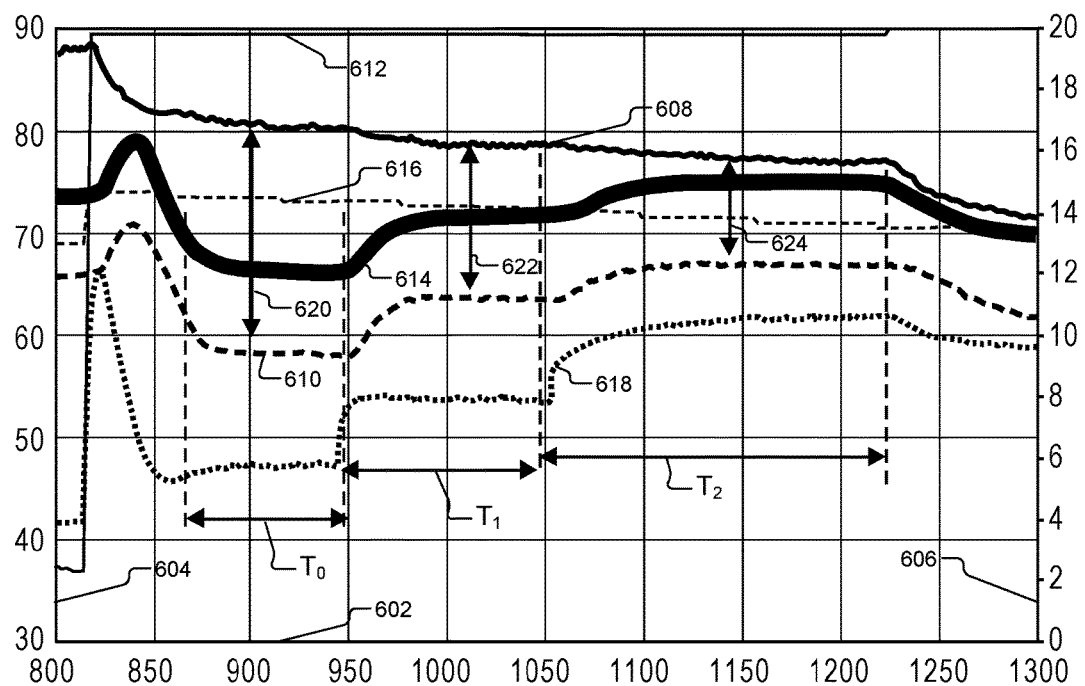
FIG. 6 is a graph illustrating the effect of an example control method according to the principles of the present disclosure.

Referring to FIG. 6, a graph illustrates the effect of another example coolant flow control method according to the principles of the present disclosure with respect to method 400. The graph includes an x-axis 602, a first y-axis 604, a second y-axis 606, an estimated heater core inlet coolant temperature 608, an estimated heater core outlet coolant temperature 610, a blower fan speed 612 (i.e., a blower fan speed percentage), an estimated heater core air out temperature 614, a target heater core air out temperature 616, and an actual coolant flow through the heater core 618 (i.e., Liters per minute). The x-axis 602 represents time, the first y-axis 604 represents the temperature, and the second y-axis 606 represents blower speed.

FIG. 6 illustrates various time periods $T_0$, $T_1$, $T_2$ and corresponding temperature differences 620, 622, and 624 between an estimated heater core outlet coolant temperature 610 and an estimated heater core inlet coolant temperature 608 (i.e., the temperature difference). Each of the respective temperature differences 620, 622, 624 have a difference flowrate associated therewith. As shown, the temperature difference 620 is higher than temperature differences 622, 624. As shown, a higher heater core in/out temperature difference results in a lower amount of coolant flow through the heater core 120. However, as described above, the heater core air out temperature is maintained by adjusting a coolant flowrate and the target delta coolant temperature difference.

Figure 7:
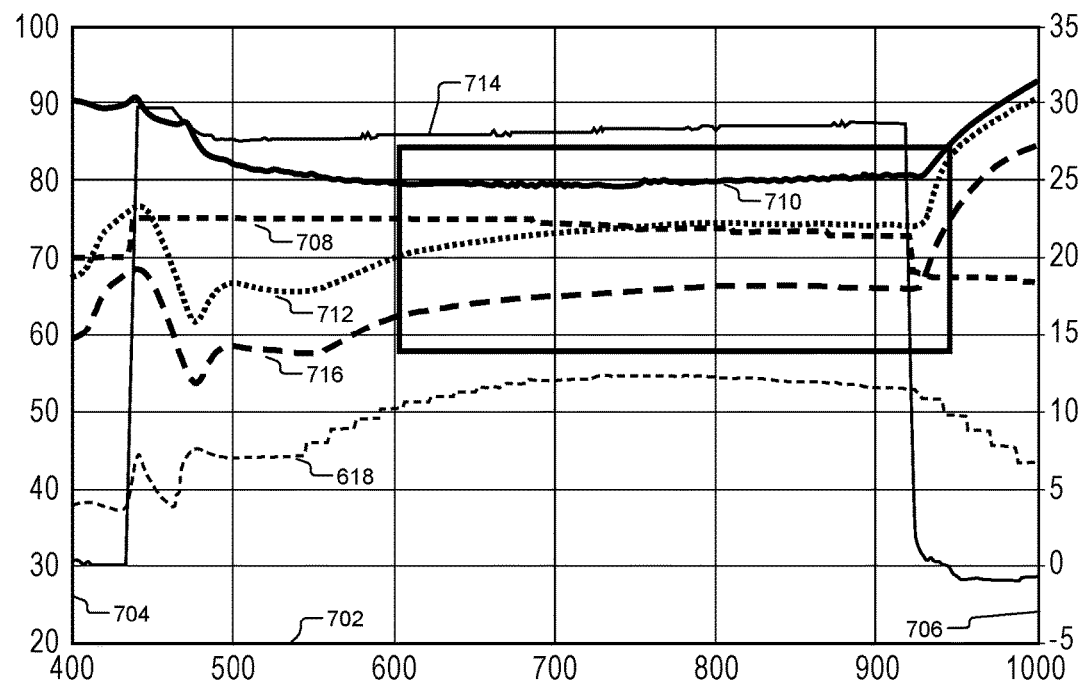
FIG. 7 is a graph illustrating the effect of an example control method according to the principles of the present disclosure.

Referring to FIG. 7, a graph illustrates the effect of an example coolant flow control method according to the principles of the present disclosure according to method 300. The graph includes an x-axis 702, a first y-axis 704, a second y-axis 706, a target heater core air out temperature 708, a heater core inlet coolant temperature 710, an estimated heater core air out temperature 712, a blower fan speed (i.e., air flow) 714, and a heater core outlet coolant temperature 716. The x-axis 702 represents time in seconds, the first y-axis 704 represents the temperature, and the second y-axis 706 represents blower speed generating the air flow. This graph illustrates that the estimated heater core air temperature 712 can be maintained around the target heater core air out temperature 708 by controlling a coolant flowrate as described above.

Figure 8:
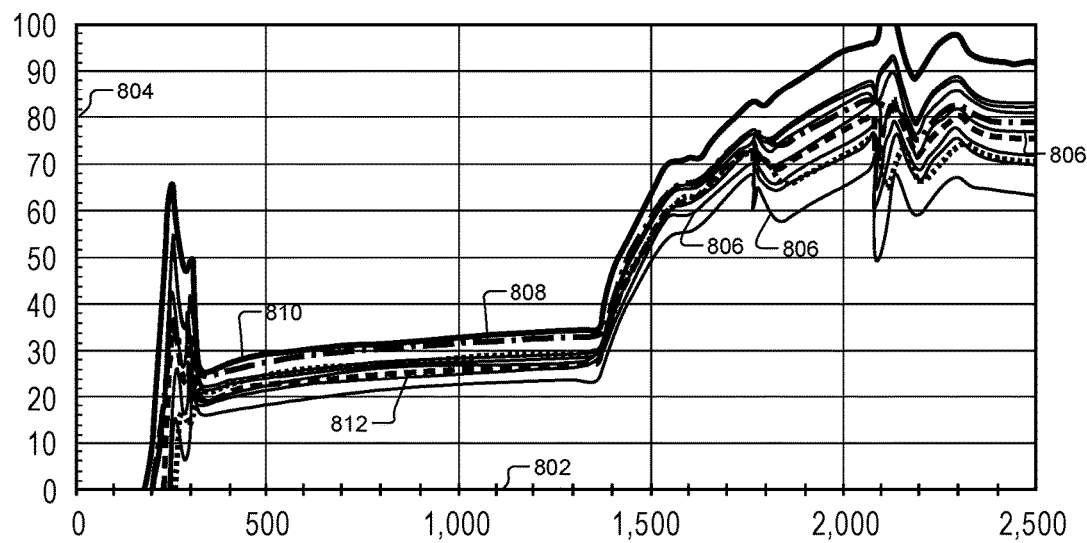
FIG. 8 is a graph illustrating the effect of an example control method according to the principles of the present disclosure.

Referring to FIG. 8, a graph illustrates the effect of an example coolant flow control method according to the principles of the present disclosure according to method 300. The graph includes an x-axis 802, a y-axis 804, a temperature measurement 806 obtained from multiple thermocouple sensors deployed over the heater core 120 measuring a temperature of the heater core 120, an estimated heater core air out temperature 808, a heater core inlet coolant temperature 810, and an average temperature 812 as measured by the multiple thermocouple sensors. The x-axis 802 represents time, and the y-axis 804 represents temperature. This graph illustrates that the estimated heater core air temperature 808 corresponds to the actual heat available within the air at the exit of the heater core 120 for the purposes of passenger comfort.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
a temperature estimation module configured to determine an estimate of a heater core air out temperature of a vehicle based upon a heater core inlet coolant temperature, a heater core outlet coolant temperature, an estimated volumetric air flowrate, and an estimated volumetric coolant flowrate,
wherein the temperature estimation module is configured to estimate the heater core air out temperature using a least square estimation and is configured to estimate the heater core air out temperature based upon the heater core inlet coolant temperature, the heater core outlet coolant temperature, a volumetric coolant flowrate, and a volumetric air flowrate, wherein the temperature estimation module is configured to estimate the heater core air out temperature according to $\alpha_1 \dot{v}_{clnt} + \alpha_2 \dot{v}_{air} + \alpha_3 T_{Clnt,In} + \alpha_4 T_{Clnt,Out} + \alpha_5$, where $\dot{v}_{clnt}$ is a volumetric coolant flowrate, $\dot{v}_{air}$ is the volumetric air flowrate $T_{Clnt,In}$ is the heater core inlet coolant temperature, $T_{Clnt,Out}$ is the heater core outlet coolant temperature, and $\alpha_i$ represents respective least square estimate coefficients; and
a coolant flow control module configured to:
control a coolant flowrate at which coolant flows to a heater core of the vehicle by adjusting at least one of a position of a coolant control valve of the vehicle and an output of a coolant pump of the vehicle; and
control the coolant flowrate to decrease a difference between a target heater core air out temperature and the estimated heater core air out temperature.

2. The system of claim 1 wherein the estimated heater core air out temperature is bounded by the heater core inlet coolant temperature having a predefined offset and the heater core outlet coolant temperature having a predefined offset.

3. The system of claim 1 wherein the coolant flow control module is configured to compare the difference between the target heater core air out temperature and the estimated heater core air out temperature, determine whether the difference exceeds a predefined error threshold, and controls the coolant flowrate to decrease a difference between the target heater core air out temperature and the estimated heater core air out temperature.

4. The system of claim 1 wherein the target heater core air out temperature is determined based on blower speed and ambient temperature.

5. The system of claim 1 wherein the coolant flow control module is configured to adjust the coolant flowrate based upon at least one of a predetermined coolant flowrate and a predetermined increment.

6. The system of claim 1 wherein the coolant flow control module is configured to adjust the coolant flowrate based upon at least one of a variable coolant flowrate and a variable increment.

7. The system of claim 6 wherein the variable increment is based upon a control setting.

8. The system of claim 7 wherein the control setting comprises at least one of a Proportional-Integral-Derivative (PID) control and a table look-up control.

9. The system of claim 1, further comprising:
a heater core inlet coolant temperature sensor disposed at an heater core inlet line to measure the heater core inlet coolant temperature entering a heater core of a vehicle; and a heater core outlet coolant temperature sensor disposed at a heater core outlet line to measure the heater core outlet coolant temperature exiting the heater core.

10. The system of claim 1, further comprising a volumetric coolant flowrate estimation module that is configured to estimate a volumetric coolant flowrate of a coolant.

11. The system of claim 1, further comprising an airflow estimation module that is configured to estimate a volumetric air flowrate.

12. The system of claim 1, further comprising a heater flap control module that is configured to control a heater flap opening to control an amount of air that passes through a heater flap.

13. A system comprising:
a temperature estimation module configured to determine an estimate of a heater core air out temperature of a vehicle based upon a heater core inlet coolant temperature, a heater core outlet coolant temperature, an estimated volumetric air flowrate, and an estimated volumetric coolant flowrate,
wherein the temperature estimation module is configured to estimate the heater core air out temperature using a least square estimation and is configured to estimate the heater core air out temperature based upon the heater core inlet coolant temperature, the heater core outlet coolant temperature, a volumetric coolant flowrate, and a volumetric air flowrate wherein the temperature estimation module is configured to estimate the heater core air out temperature according to $\alpha_1 \dot{v}_{clnt} + \alpha_2 \dot{v}_{air} + \alpha_3 T_{Clnt,In} + \alpha_4 T_{Clnt,Out} + \alpha_5$, where $\dot{v}_{clnt}$ is a volumetric coolant flowrate, $\dot{v}_{air}$ is the volumetric air flowrate, $T_{Clnt,In}$ is the heater core inlet coolant temperature, $T_{Clnt,Out}$ is the heater core outlet coolant temperature, and $\alpha_i$ represents respective least square estimate coefficients; and
a coolant flow control module configured to:
control a rate at which coolant flows to a heater core of the vehicle by adjusting at least one of a position of a coolant control valve of the vehicle and an output of a coolant pump of the vehicle, and
control the coolant flowrate to decrease a difference between a target heater core air out temperature and the estimated heater core air out temperature,
wherein the target heater core air out temperature is determined based on blower speed and ambient temperature.

14. The system of claim 13 wherein the estimated heater core air out temperature is bounded by the heater core inlet coolant temperature having a predefined offset and the heater core outlet coolant temperature having a predefined offset.

15. The system of claim 13, further comprising:
a heater core inlet coolant temperature sensor disposed at an heater core inlet line to measure the heater core inlet coolant temperature entering a heater core of a vehicle; and
a heater core outlet coolant temperature sensor disposed at a heater core outlet line to measure the heater core outlet coolant temperature exiting the heater core.

16. The system of claim 13 wherein the coolant flow control module is configured to compare the difference between the target heater core air out temperature and the estimated heater core air out temperature, determine whether the difference exceeds a predefined error threshold, and controls the coolant flowrate to decrease a difference between the target heater core air out temperature and the estimated heater core air out temperature.

17. The system of claim 13 wherein the target heater core air out temperature is determined based on blower speed and ambient temperature.

18. The system of claim 13 wherein the coolant flow control module is configured to adjust the coolant flowrate based upon at least one of a predetermined coolant flowrate and a predetermined increment.

19. The system of claim 13 wherein the coolant flow control module is configured to adjust the coolant flowrate based upon at least one of a variable coolant flowrate and a variable increment.

20. The system of claim 19 wherein the variable increment is based upon a control setting.

* * * * *